US012602739B2

(12) United States Patent
Shen et al.

(10) Patent No.: US 12,602,739 B2
(45) Date of Patent: Apr. 14, 2026

(54) JOINT DENOISING AND DEMOSAICKING METHOD FOR COLOR RAW IMAGES GUIDED BY MONOCHROME IMAGES

(71) Applicant: ZHEJIANG UNIVERSITY, Hangzhou (CN)

(72) Inventors: Huiliang Shen, Hangzhou (CN); Xiongwei Liu, Hangzhou (CN); Runmin Zhang, Hangzhou (CN); Siyuan Cao, Hangzhou (CN); Beinan Yu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 224 days.

(21) Appl. No.: 18/398,193

(22) Filed: Dec. 28, 2023

(65) Prior Publication Data

US 2024/0320787 A1    Sep. 26, 2024

Related U.S. Application Data

(63) Continuation of application No. PCT/CN2023/084429, filed on Mar. 28, 2023.

(30) Foreign Application Priority Data

Mar. 21, 2023    (CN) .......................... 202310277581.2

(51) Int. Cl.
*G06T 3/4015*        (2024.01)
*G06T 5/70*          (2024.01)
(Continued)

(52) U.S. Cl.
CPC .............. *G06T 3/4015* (2013.01); *G06T 5/70* (2024.01); *G06V 10/24* (2022.01); *G06V 10/44* (2022.01);
(Continued)

(58) Field of Classification Search
CPC ..................... G06T 3/4015; G06T 5/70; G06T 2207/10024; G06T 5/50; G06T 5/60;
(Continued)

(56) References Cited

U.S. PATENT DOCUMENTS

2022/0164926 A1*    5/2022    Kurmanov ................ G06T 5/70

FOREIGN PATENT DOCUMENTS

CN        108492265 A        9/2018
CN        109360147 A        2/2019
(Continued)

OTHER PUBLICATIONS

Wang et al., "Learning Parallax Attention for Stereo Image Super-Resolution," CVPR 2019 (Year: 2019).*
(Continued)

*Primary Examiner* — Wassim Mahrouka
(74) *Attorney, Agent, or Firm* — Wiersch Law Group

(57)        ABSTRACT

Disclosed is a joint denoising and demosaicking method for a color RAW image guided by a monochrome image. The method comprises: constructing a synthetic image dataset of a monochrome-color binocular camera system for training and testing of network modules; constructing an aligned guidance image generation module by utilizing a structural correlation between a monochrome image and a color image, using a clean grayscale image corresponding to the RAW image as supervision, and training the aligned guidance image generation module by using a perceptual loss function to generate a high-quality aligned guidance image; using the generated aligned guidance image to guide the joint denoising and demosaicking process of the color RAW image; and training a guided denoising and demosaicking module ensure the accuracy of the color of the denoising and demosaicking result while accurately transferring the guidance image structure.

6 Claims, 8 Drawing Sheets

(51) Int. Cl.

| | |
|---|---|
| *G06V 10/24* | (2022.01) |
| *G06V 10/44* | (2022.01) |
| *G06V 10/80* | (2022.01) |

(52) U.S. Cl.
CPC .. *G06V 10/806* (2022.01); *G06T 2207/10024* (2013.01)

(58) Field of Classification Search
CPC .................. G06T 3/4007; G06T 3/4046; G06T 2207/20081; G06T 2207/20084; G06V 10/24; G06V 10/44; G06V 10/806; Y02T 10/40; G06N 3/08
See application file for complete search history.

(56) References Cited

FOREIGN PATENT DOCUMENTS

| CN | 110009590 | A | 7/2019 |
|---|---|---|---|
| CN | 110089103 | A | 8/2019 |
| CN | 111127336 | A | 5/2020 |
| CN | 111861902 | A | 10/2020 |
| CN | 113658060 | A | 11/2021 |
| CN | 115100035 | A | 9/2022 |

OTHER PUBLICATIONS

Li et al., "Robust Joint Image Reconstruction from Color and Monochrome Cameras" BMVC 2019 (Year: 2019).*
Wang et al. "Practical Deep Raw Image Denoising on Mobile Devices" ECCV 2020 (Year: 2020).*
Johnson et al. "Perceptual Losses for Real-Time Style Transfer and Super-Resolution" ECCV 2016 (Year: 2016).*
International Search Report (PCT/CN2023/084429); Date of Mailing: Sep. 21, 2023.
Chinese Office Action mailed Aug. 4, 2025, issued in related Chinese Application No. 202310277581.2, 5 pages.
Efficient Demosaicking Algorithm Based on Residual Interpolation and Convolution Neural Network.
Color image demosaicing based on deep learning.

* cited by examiner

FIG. 2

JOINT DENOISING AND DEMOSAICKING METHOD FOR COLOR RAW IMAGES GUIDED BY MONOCHROME IMAGES

CROSS-REFERENCE TO RELATED APPLICATIONS

The present application is a continuation of International Application No. PCT/CN2023/084429, filed on Mar. 28, 2023, which claims priority to Chinese Application No. 202310277581.2, filed on Mar. 21, 2023, the contents of both of which are incorporated herein by reference in their entireties.

TECHNICAL FIELD

The present disclosure relates to the field of image processing, and in particular, to a joint denoising and demosaicking method for color RAW images guided by monochrome images.

BACKGROUND

Image denoising and demosaicking is an essential part of the color camera image processing process. The existing methods generally first denoise the image in the RAW domain, and then use the demosaicking algorithm to convert the image into the RGB domain. With the development of deep learning technology, a neural network-based algorithm model has achieved better results in both denoising and demosaicking tasks. With the support of a large amount of training data and model parameters, it is possible to model multiple degradation types simultaneously using neural networks. Therefore, a joint denoising and demosaicking network can model both processes simultaneously to prevent error accumulation and reuse image features. For example, according to the paper titled "Beyond Joint Demosaicking and Denoising: An Image Processing Pipeline for a Pixel bin Image Sensor" presented at the 2021 IEEE/CVF Conference on Computer Vision and Pattern Recognition Workshops, various mechanisms, such as attention modules and adversarial training, are introduced to enhance the joint denoising and demosaicking effects. However, while neural networks can learn the image restoration process well, in low signal-to-noise ratio dark scenes, single-image restoration algorithms encounter performance bottlenecks in noise reduction and detail recovery.

On the other hand, with the development of multi-sensor devices, multi-image fusion processing has become a crucial means to break through the bottleneck of single-image algorithms. The monochrome-color binocular camera system is widely used in devices such as smartphones. Compared to the color cameras, the imaging process of monochrome cameras is not affected by color filters and has a higher amount of light, thus providing a significant advantage in imaging quality. Guiding color cameras for denoising and demosaicking based on monochrome cameras can leverage the strengths of multiple sensors combinations. However, the existing guided restoration neural network methods cannot directly deal with non-aligned scenes. According to the paper titled "Robust Joint Image Reconstruction from Color and Monochrome Cameras" presented at the 2019 British Machine Vision Conference, binocular images are first registered at the pixel level based on optical flows to mitigate the effects of parallax, and then the restoration results are solved iteratively by using traditional optimization methods. The method involves a significant computational load and faces challenges in achieving precise registration, especially in low signal-to-noise ratio scenes, which further impacts the subsequent joint denoising and demosaicking processes.

SUMMARY

The present disclosure proposes a joint denoising and demosaicking method for a color RAW image guided by a monochrome image, starting from the imaging advantages of monochrome cameras. In order to eliminate non-aligned factors caused by parallax between the monochrome image and the color RAW image, the present disclosure constructs an aligned guidance image generation module based on an attention mechanism, and trains the aligned guidance image generation module based on a perceptual loss function to generate a high-quality aligned guidance image for guiding the color RAW image denoising and demosaicking. Meanwhile, the present disclosure trains a joint guided denoising and demosaicking network module based on a color-structure joint loss function, resulting in better visual effects of restoration results. The method of the present disclosure can process non-aligned guided joint denoising and demosaicking scenes containing parallax by generating high-quality aligned guidance images, while allowing monochrome images to be contaminated by noises without affecting the guiding effect. The impact of binocular parallax and the noises of the monochrome image is reduced based on a parallax attention mechanism, and the information of monochrome image in the monochrome-color binocular system is utilized to assist in the joint denoising and demosaicking process of the color image.

The present disclosure provides a joint denoising and demosaicking method for a color RAW image guided by a monochrome image. The method performs denoising and demosaicking on the color RAW image under the guidance of the monochrome image in parallax scenarios, including the following steps:

S1, a synthetic noisy dataset of a monochrome-color binocular camera system in a dark scene is constructed.

S2: a joint denoising and demosaicking model is constructed based on the dataset in the step S1.

The joint denoising and demosaicking model includes an aligned guidance image generation module and a guided denoising and demosaicking module.

S21, the aligned guidance image generation module is constructed: computing a feature correlation between the monochrome image and a RAW image in a parallax direction based on a parallax attention mechanism by the aligned guidance image generation module, and constructing an aligned guidance image feature by aggregating the relevant structural feature to obtain an aligned guidance image; and using a clean grayscale image ground truth corresponding to the RAW image as supervision, and training the aligned guidance image generation module based on a perceptual loss function until convergence, so that the aligned guidance image generated by the aligned guidance image generation module is structurally similar to the RAW image as much as possible.

S22, the guided denoising and demosaicking module is constructed: extracting a feature of the RAW image and a feature of the aligned guidance image, respectively, by the guided denoising and demosaicking module, performing feature fusion on the feature of the RAW image and the feature of the aligned guidance image through channel concatenation among the feature dimension after up-sampling the feature of the RAW image, generating a clean RGB image corresponding to the RAW image through the feature decoder, and completing a guided denoising process and a guided demosaicking process simultaneously; and training the guided denoising and demosaicking module based on a color-structure joint loss function until convergence, so that the denoising and demosaicking result has both an accurate color reconstruction and a sharp detail structure.

The aligned guidance image generation module fuses the non-local information of the monochrome camera image with the information of the color camera image based on the parallax attention mechanism to generate high-quality guidance images aligned with color images; and the guided denoising and demosaicking module guides the joint denoising and demosaicking process of the color RAW images based on high-quality aligned guidance images.

S3: the color RAW image is denoised and demosaicked based on the joint denoising and demosaicking model constructed in the step S2. By using the aligned guidance image generation module, an additional high signal-to-noise ratio information provided by the monochrome camera image is utilized to reduce the impact of non-aligned factors. Meanwhile, the denoising and demosaicking process of the color RAW image is guided to output a color image with a good visual effect.

In the step S1, a large number of synthetic noisy datasets of monochrome-color binocular camera system in dark scenes is generated for training and testing of the joint denoising and demosaicking model based on the existing color binocular image dataset. The construction method for the synthetic noisy datasets of the monochrome-color binocular camera system is as follows:

S11, each pixel in the normal images captured by a color binocular camera system is divided by K in brightness to simulate the dark scene.

S12, for a left view, a value of a color channel is sampled based on a Bayer pattern of RGGB to generate the RAW image; and for a right view, a complete amount of light entering the monochrome camera is simulated by adding values of three color channels to generate the monochrome image.

S13, the Poisson-Gaussian noise with same parameters is added to the monochrome image and the RAW image.

The construction of the joint denoising and demosaicking model in the step S2 includes two parts: one is to construct the aligned guidance image generation module, and the other is to build the guided denoising and demosaicking module:

Computing a feature correlation between the monochrome image and a RAW image in a parallax direction based on a parallax attention mechanism by the aligned guidance image generation module, and constructing an aligned guidance image feature by aggregating the relevant structural feature further includes:

firstly demosaicking the RAW image based on a traditional demosaicking algorithm, and transforming the RAW image into a single channel grayscale image by adding the three color channels; next, extracting a RAW image feature $F_{raw}$ and a monochrome image feature $F_{mono}$ from the left view and the right view through a same feature extractor, which can reduce noise interference and enhance structural information; subsequently, computing a correlation weight matrix M in the parallax direction for the RAW image feature $F_{raw}$ and the monochrome image feature $F_{mono}$ based on the parallax attention mechanism, and using a correlation in a row direction to construct the aligned guidance image feature: $\hat{F}_{raw}=f(F_{mono})*M$, where f represents a convolution operation, and $\hat{F}_{raw}$ represents the aligned guidance image feature, obtained by weighted fusion of the feature of the guidance monochrome image based on parallax correlation; and finally, decoding the aligned guidance image feature $\hat{F}_{raw}$ into the aligned guidance image, which is structurally consistent with a target color image, by using a feature decoder.

The correlation weight matrix M is computed as follows: for the RAW image feature $\hat{F}_{raw}$ and the monochrome image feature $F_{mono}$ from the left view and the right view, both tensor dimensions are H×W×C, where H, W, and C represent a height, a width, and a number of channels of a feature tensor, respectively; first, passing the RAW image feature $F_{raw}$ from the left view through a convolutional layer of 3×3 to generate a query tensor, passing the monochrome image feature $F_{mono}$ from the right view through two unshared convolutional layers of 3×3, respectively, to generate a key tensor and a value tensor, wherein the query tensor, the key tensor and the value tensor all have a dimension of H×W×C; rearranging and converting the dimension of the key tensor to H×C×W; performing a matrix multiplication on the query tensor and the rearranged key tensor to obtain a correlation calculation result matrix with a dimension of H×W×W, and obtaining the correlation weight matrix M in the row direction by a SoftMax operation.

The perceptual loss function is used as the loss function during the training of the aligned guidance image generation module. The perceptual loss function in the step S2 is defined as: $L_P=\|F_{VGG}(\hat{G})-F_{VGG}(G)\|_2$, where $L_P$ represents the perceptual loss function; $\hat{G}$ represents an output result of the aligned guidance image generation module; G represents a reference ground truth for supervision, and is set to the clean grayscale image corresponding to the RAW image; and $F_{VGG}(\bullet)$ represents an image feature extracted by a pre-trained VGG model. The perceptual loss function is used to calculate a distance between the output result and the ground truth in VGG feature space. By optimizing the distance during training, the generated aligned guidance image can focus more efficiently on structure reconstruction.

The guided denoising and demosaicking module utilizes the generated high-quality aligned guidance image to replace the non-aligned monochrome noisy image, and guides the joint denoising and demosaicking process of color RAW image. The guided denoising and demosaicking module extracts the features of the RAW image with noises and the features of the high-quality aligned guidance image, respectively, and performs feature fusion through feature concatenation among the channel dimension. Based on the color-structure joint loss function, the guided denoising and demosaicking module is trained to directly decode and generate the clean RGB image corresponding to the RAW image, and completing the guided denoising process and the guided demosaicking process simultaneously.

The neural network mainly learns structural information from the aligned guidance image and color information from the RAW image, and employs the color-structure joint loss function as the loss function for training the guided joint denoising and demosaicking module. The color-structure joint loss function in the step S2 is defined as: $L_{pc}=\|F_{VGG}(\hat{Y})-F_{VGG}(Y)\|_2+\|F_{gaussian}(\hat{Y})-F_{gaussian}(Y)\|_2$, where $L_{pc}$ represents the color-structure joint loss function; $\hat{Y}$ represents a joint denoising and demosaicking result; Y represents a reference ground truth, which is set to a clean RGB image corresponding to the RAW noisy image. The first term of the loss function is a structural loss, $F_{VGG}(\bullet)$ represents an image feature extracted by a pre-trained VGG model, constraining the structural information of the output results through VGG spatial features; and the second term of the loss function is a color loss, $F_{gaussian}(\bullet)$ represents image low-frequency information extracted through Gaussian filtering, and the color loss function calculates a loss in low-frequency space of the image by $F_{gaussian}(\bullet)$. The joint denoising and demosaicking result is constrained in terms of both structural and color aspects, so that the structural information can be fully transferred, while maintaining accurate color fidelity in the output results.

The beneficial effect of the present disclosure are as follows: the non-aligned factors in the guiding process are eliminated based on the parallax attention mechanism, allowing the guidance information of monochrome camera images to be accurately assigned to the denoising and demosaicking process of color camera images in parallax scenarios. Meanwhile, through the design and combination of the perceptual loss function and the color-structure joint loss function, accurate high-frequency detail structure is reconstructed after denoising, while the demosaicking process achieves an accurate color interpolation effect. The present disclosure has significant application value for binocular imaging devices in the dark scene.

BRIEF DESCRIPTION OF DRAWINGS

FIG. 2 is a workflow diagram of the aligned guidance image generation module of the present disclosure.

DESCRIPTION OF EMBODIMENTS

The present disclosure will be further explained below in conjunction with specific embodiments and accompanying drawings.

EXAMPLE

Firstly, the synthetic monochrome-color binocular image dataset is constructed based on the color binocular image dataset.

In an embodiment, the normal images captured by the color binocular cameras are divided by K in brightness to simulate the dark scene (the maximum pixel value of a dark scene image is less than 40). For the left view, the value of the color channel is sampled based on the Bayer patter of RGGB to generate the Bayer RAW image. For the right view, the complete amount of light entering the monochrome camera is simulated by adding values of three color channels to generate the monochrome image. Finally, since the monochrome-color cameras are inevitably contaminated by real noises in actual scenes, the Poisson-Gaussian noise with same parameters is added to the monochrome image and the RAW image. As a result, a noisy RAW-monochrome binocular image pair is obtained for subsequent network training in the dark scene.

Figure 1:
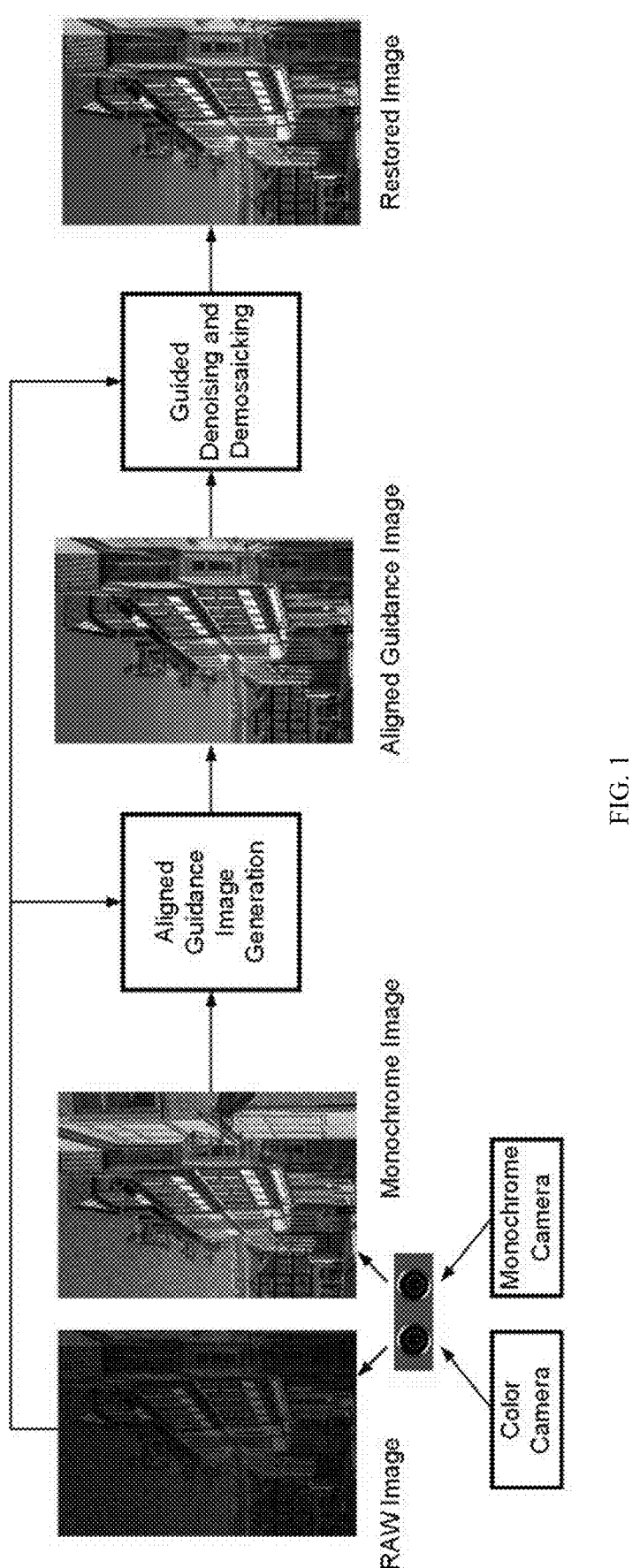
FIG. 1 is a flowchart of the method of the present disclosure.

The network architecture of the method of the present disclosure is shown in FIG. 1, mainly divided into two modules: the aligned guidance image generation module and the guided denoising and demosaicking module.

Figure 2:
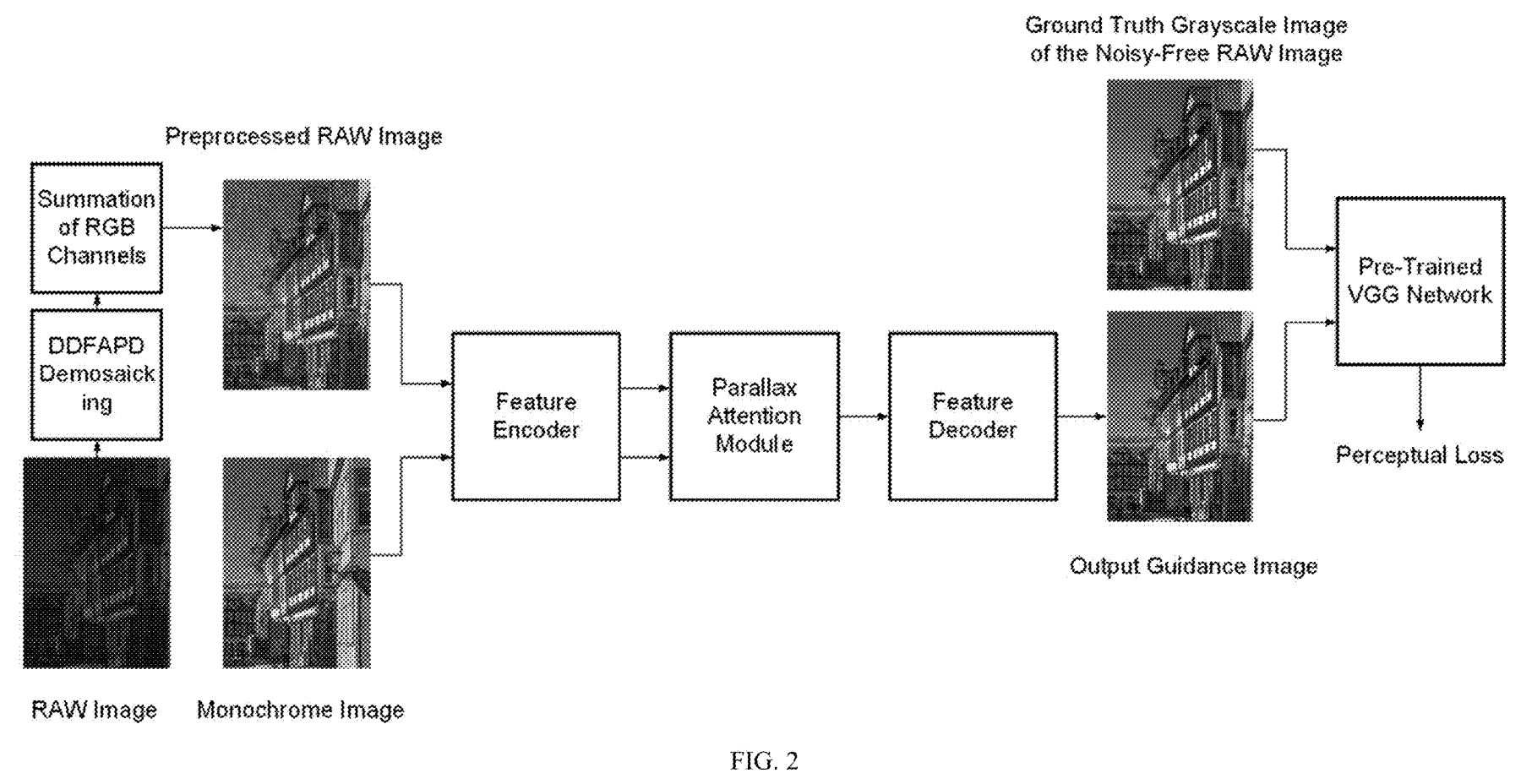

The aligned guidance image generation module, as shown in FIG. 2, eliminates non-aligned factors between the monochrome image and the RAW image based on the parallax attention mechanism to generate the aligned guidance image. Meanwhile, the monochrome ground truth of the RAW image is used as supervised information, and the perceptual loss is used as a loss function to train the aligned guidance image generation module separately until convergence.

Figure 3:
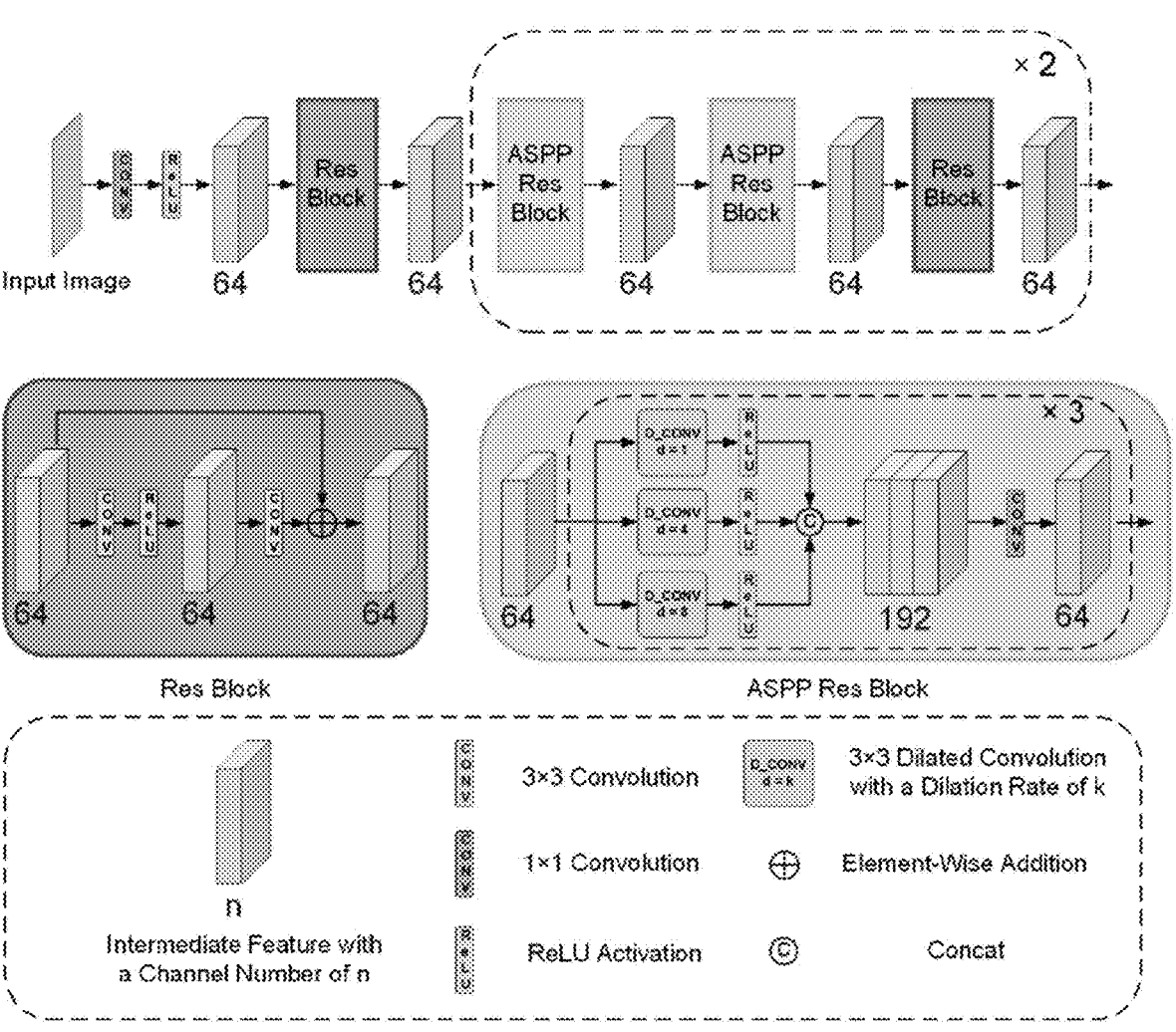
FIG. 3 is a structure diagram of the feature extractor of the present disclosure.

The specific description of the aligned guidance image generation process based on the parallax attention mechanism is as follows:

Firstly, for the left camera image and the right camera image, the same feature encoder is used for feature encoding. The specific structure of the feature encoder is shown in FIG. 3. The RAW image is demosaicked based on the traditional demosaicking algorithm DDFAPD, and is transformed into the single channel grayscale image by adding the three color channels. The feature encoding process includes two important roles: the noise of the RAW image and the monochrome image are suppressed through feature encoding, reducing interference to structural similarity judgment; and the target RAW image and the guidance monochrome image are converted into the same feature space simultaneously, preserving the structural correlation between the target RAW image and the guidance monochrome image.

Second, the RAW image feature $F_{raw}$ and the monochrome image feature $F_{mono}$ from the left view and the right view are extracted through a same feature extractor.

Figure 4:
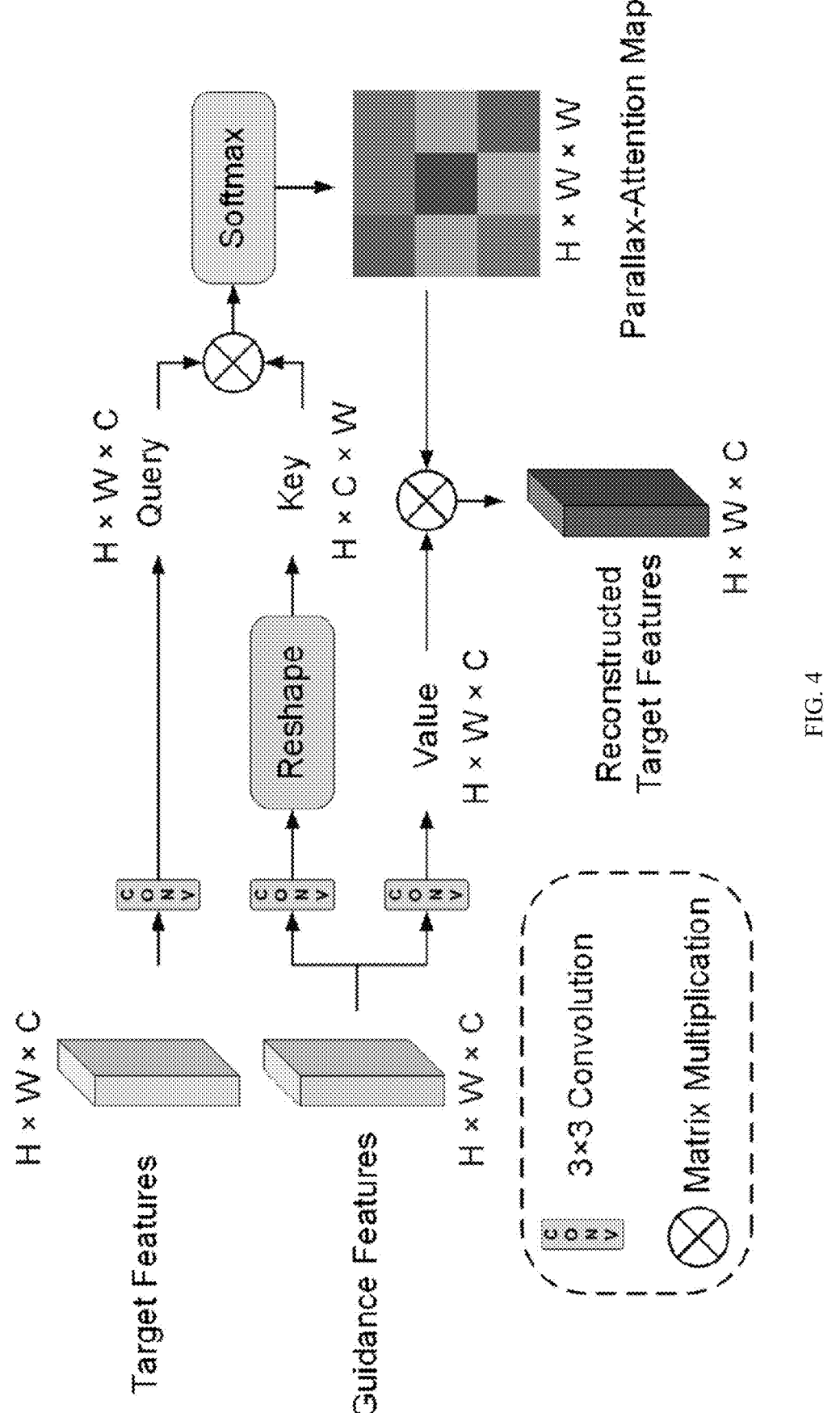
FIG. 4 is a network schematic diagram fusing the left and right view features based on the parallax attention mechanism of the present disclosure.
Figures 5A, 5B, 5C, 5D, 5E:
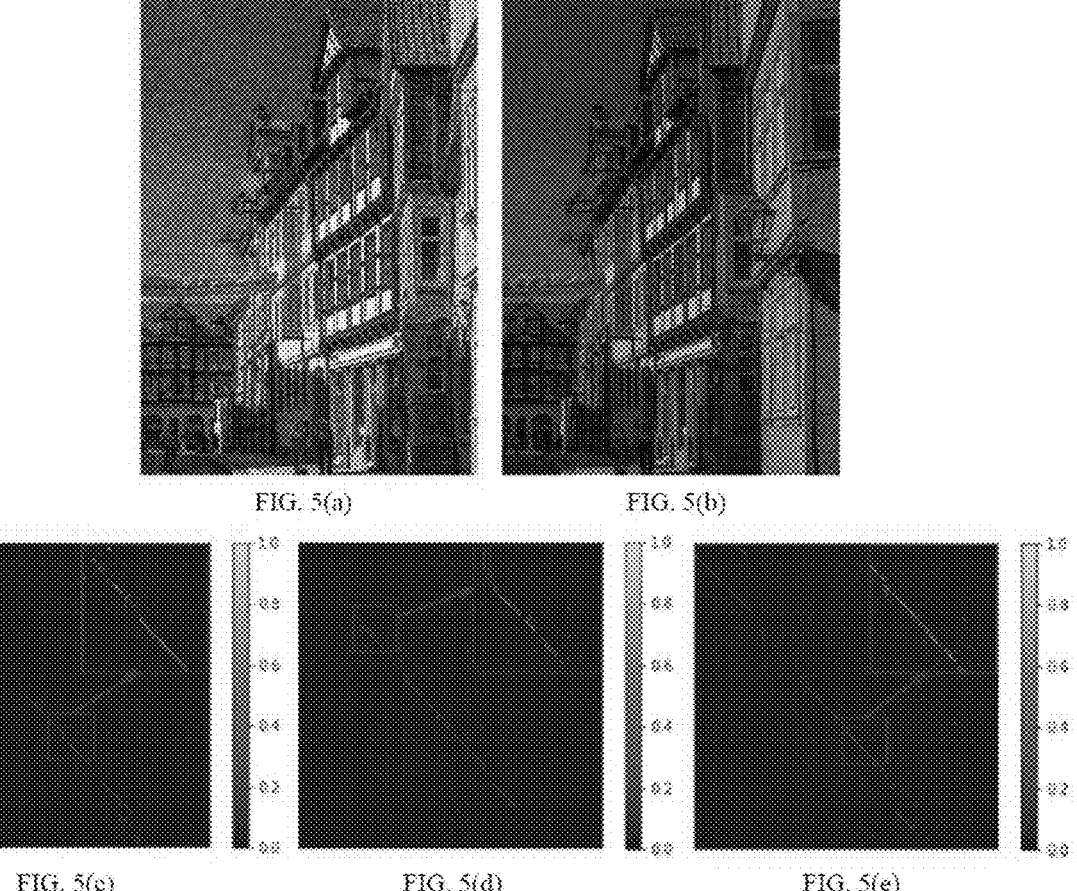
FIGS. 5(*a*), 5(*b*), 5(*c*), 5(*d*) and 5(*e*) are schematic diagrams of the aligned guidance image generation principle based on the parallax attention mechanism. In the figure, (a) is a visualization result of the target image, which is captured by the left camera; (b) is a monochrome image, which is captured by the right camera; and the parallax attention results for the three rows of pixels indicated in (a) and (b), labeled as L1, L2, and L3, are shown in (c), (d), and (e), respectively.

Subsequently, the left view feature and the right view feature are fused based on the parallax attention mechanism, and the specific structure is shown in FIG. 4. Due to the non-aligned factors caused by parallax generally appearing in the same row, the correlation between the left view feature and the right view feature on the same row is calculated based on the parallax attention mechanism. The correlation weight matrix M is computed in the parallax direction for the RAW image feature $F_{raw}$ and the monochrome image feature $F_{mono}$, and the correlation in a row direction is used to construct the aligned guidance image feature: $\hat{F}_{raw} = f(F_{mono}) * M$, where f represents convolution operation, and $\hat{F}_{raw}$ represents the aligned guidance image feature; and decoding the aligned guidance image feature $\hat{F}_{raw}$ into the aligned guidance image, which is structurally consistent with a target color image, by using a feature decoder. The aligned guidance image feature is computed by linearly combining the monochrome image feature value on the corresponding row based on correlation.

The correlation weight matrix M is computed as follows: for the RAW image feature $F_{raw}$ and the monochrome image feature $F_{mono}$ from the left view and the right view, both tensor dimensions are H×W×C, where H, W, and C represent a height, a width, and a number of channels of a feature tensor, respectively. The RAW image feature $F_{raw}$ from the left view is passed through the convolutional layer of 3×3 to generate the query tensor, the monochrome image feature $F_{mono}$ from the right view is passed through two unshared convolutional layers of 3×3, respectively, to generate the key tensor and the value tensor. The query tensor, the key tensor and the value tensor all have a dimension of H×W×C. The dimension of the key tensor is rearranged and converted to H×C×W. The matrix multiplication is performed on the query tensor and the rearranged key tensor to obtain the correlation calculation result matrix with a dimension of H×W×W, and the correlation weight matrix M in the row direction is obtained by a SoftMax operation.

The visualization results of feature correlation of the parallax attention mechanism are shown in FIGS. 5(a), 5(b), 5(c), 5(d) and 5(e). FIG. 5 (a) shows the visualization results of the left camera target image, and FIG. 5 (b) shows the monochrome image of the right camera. For the L1, L2, and L3 rows of pixels indicated in FIG. 5 (a) and FIG. 5 (b), the feature correlation results are shown in FIG. 5 (c), FIG. 5 (d), and FIG. 5 (e). The feature correlation matrix forms a clear peak value in the diagonal direction, and shows that the dislocation structure caused by parallax is well captured under the parallax attention mechanism.

Finally, the aligned guidance image is decoded and generated based on the aligned guidance image feature $\hat{F}_{raw}$. In order to generate the aligned guidance images with low noise and clear structure, the algorithm employs the ground truth grayscale image corresponding to the RAW image as training supervision, and employs the perceptual loss as the loss function to train the aligned guidance image generation module. The perceptual loss function in the step S2 is defined as: $L_p = \|F_{VGG}(\hat{G}) - F_{VGG}(G)\|_2$, where $L_p$ represents the perceptual loss function; $\hat{G}$ represents the output result of the aligned guidance image generation module; G represents the reference ground truth for supervision, and is set to the clean grayscale image corresponding to the RAW image; and $F_{VGG}$ (•) represents the image features extracted through the pre-trained VGG model. The perceptual loss function optimizes the generated results of the aligned guidance image generation module by calculating the distance of the feature space of the pre-trained VGG network, making the structure more consistent and visually appealing to the human eye.

Figure 6:
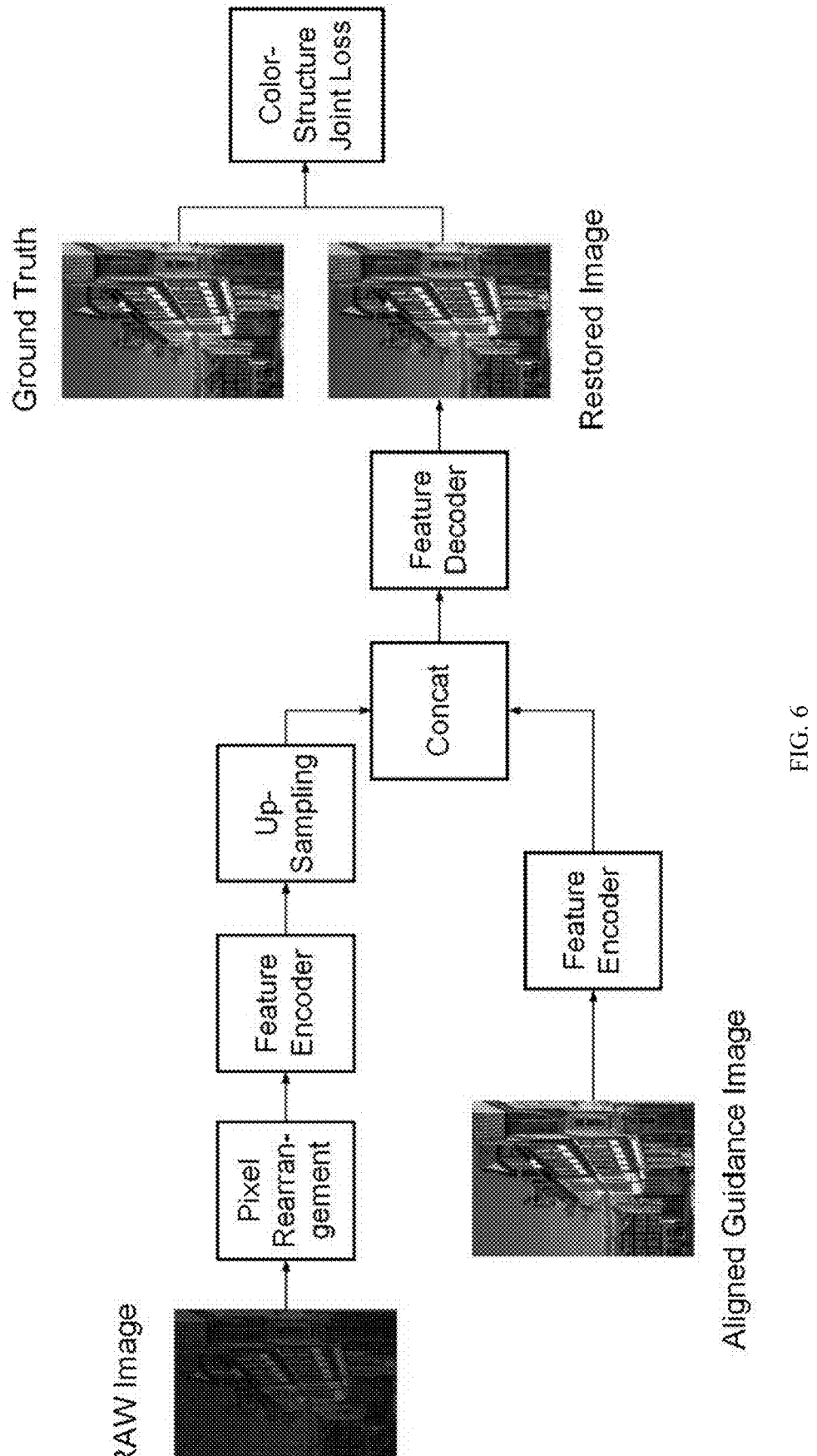
FIG. 6 is a workflow diagram of the guided denoising and demosaicking module of the present disclosure.
Figure 7:
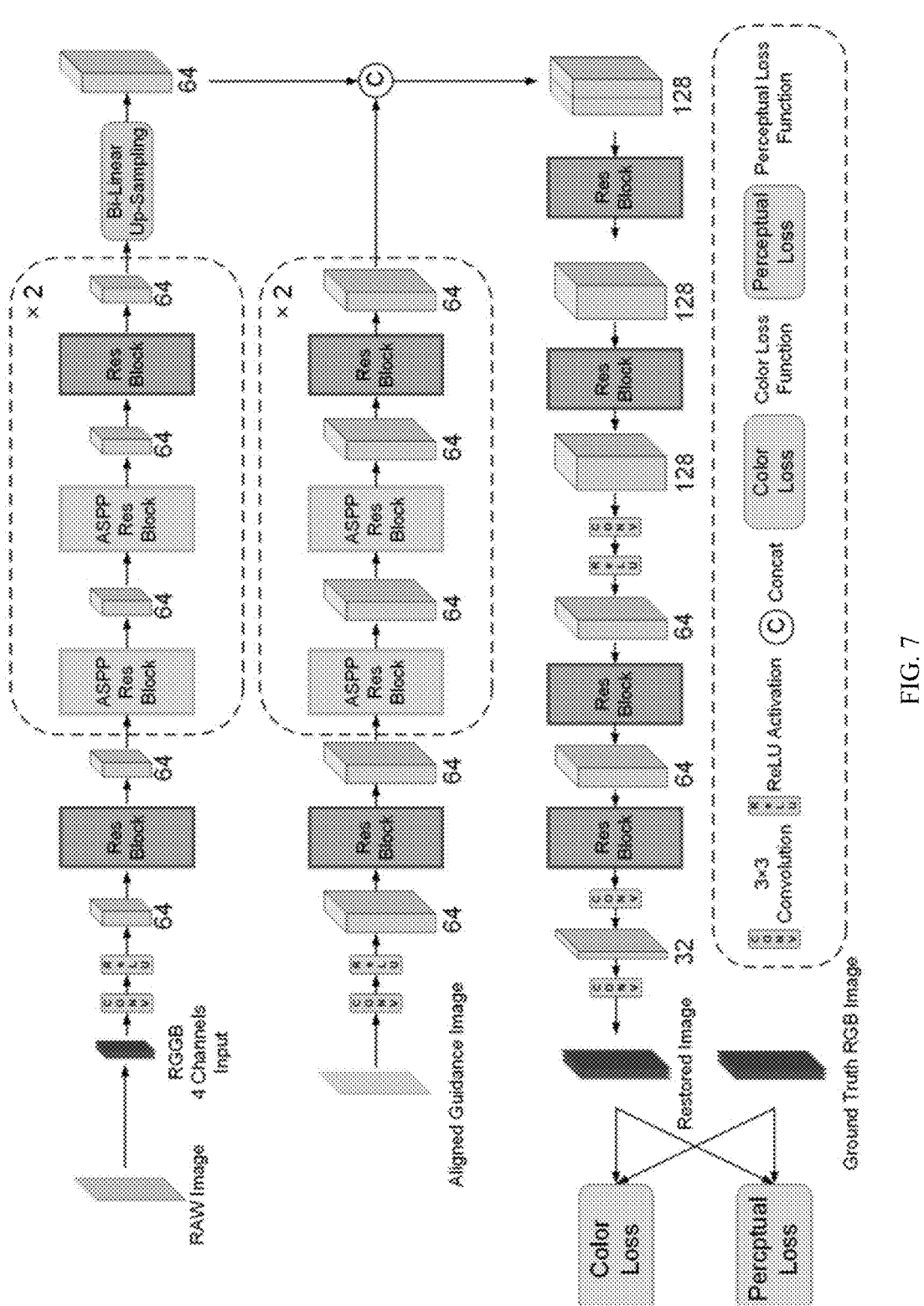
FIG. 7 is a network architecture diagram of the guided denoising and demosaicking module of the present disclosure.

The guided denoising and demosaicking module, shown in FIG. 6, extracts the RAW image feature and the aligned guidance image feature, respectively, and up-samples the resolution of the RAW image feature. The information of the RAW image feature and the aligned guidance image feature is fused through feature concatenation among the channel dimension, and finally the joint denoising and demosaicking results are outputted through the feature decoder. Based on the color-structure joint loss function, the guided denoising and demosaicking module is trained to achieve an accurate color reconstruction and a sharp detail structure in the joint denoising and demosaicking results. The specific network structure of the guided denoising and demosaicking module is shown in FIG. 7.

The color-structure joint loss function is defined as:

$$L_{pc} = \left\|F_{VGG}(\hat{Y}) - F_{VGG}(Y)\right\|_2 + \left\|F_{gaussian}(\hat{Y}) - F_{gaussian}(Y)\right\|_2$$

where $L_{pc}$ represents the color-structure joint loss function, the first term being the perceptual loss function, and the second term being the color loss function; $F_{VGG}(•)$ represents the image features extracted through the pre-trained VGG model, and the perceptual loss function calculates the loss in the deep feature space of the image through $F_{VGG}$ (•) function. $F_{gaussian}$ (•) represents the image low-frequency information extracted through Gaussian filtering, and the color loss function calculates the loss in low-frequency space of the image by $F_{gaussian}$ (•). The color-structure joint loss function constrains the various structures of image content in the VGG feature space, while constrains the overall brightness of image content in the low-frequency space of the image. The combination of the two helps to fully transfer various structures in the guidance image to the target image during the training process, while preventing the influence of guidance image brightness on color reconstruction, thus obtaining the guided joint denoising and demosaicking results with clear structure and accurate color.

Figures 8A, 8B, 8C, 8D, 8E, 8F:
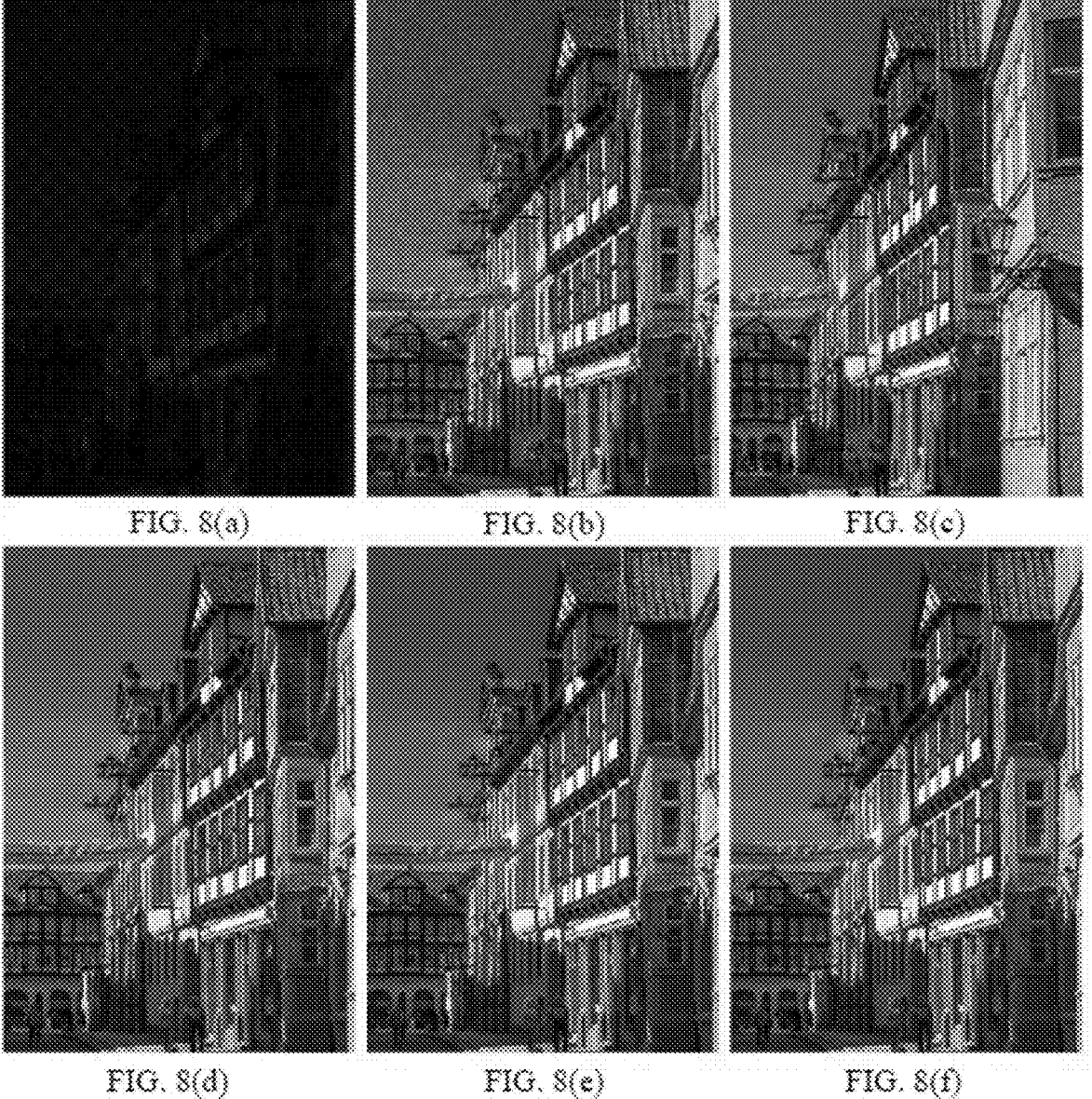
FIGS. 8(*a*), 8(*b*), 8(*c*), 8(*d*), 8(*e*) and 8(*f*) is a specific embodiment diagram of the joint guided denoising and demosaicking process under the guidance of the aligned guidance image generated by the monochrome image of the present disclosure. In the figure, FIG. 8(*a*) is the synthetic RAW image of the color camera under low light conditions, FIG. 8(*b*) is the visualization image obtained after initial demosaicking and brightness stretching of FIG. 8(*a*), FIG. 8(*c*) is the input monochrome camera image, FIG. 8(*d*) is the generated aligned guidance image, FIG. 8(*e*) is the joint denoising and demosaicking result, and FIG. 8(*f*) is the reference target image.

FIG. 8(a), 8(b), 8(c), 8(d), 8(e) and 8(f) show the operation results of a specific embodiment based on the method of the present disclosure. In FIG. 8(d), the aligned guidance image, generated by the method of the present disclosure, has low noise, clear structure, and is consistent with the structure of the target color image. FIG. 8(e) shows the joint denoising and demosaicking results generated by the method of the present disclosure. Compared with the reference target image in FIG. 8(f), the structure and color are consistent.

The present disclosure proposes a novel guided denoising and demosaicking method based on the monochrome-color binocular camera system, which generates the high-quality aligned guidance image in non-aligned scenes containing parallax. Based on the color-structure joint loss function, the joint denoising and demosaicking results with good visual perception are obtained. When the method of the present disclosure is deployed in a monochrome-color binocular system, the advantage of the monochrome camera in imaging, unaffected by color filters, is utilized to assist in the demosaicking process of the color camera, and the advantage of the monochrome camera in imaging having a larger amount of light when simultaneously imaging in the binocular system is utilized to assist in the denoising process of the color camera.

What is claimed is:

1. A joint denoising and demosaicking method for a color RAW image guided by a monochrome image, wherein the method performs denoising and demosaicking on color RAW images under a guidance of the monochrome image in parallax scenarios, comprising:

step S1, dataset construction: constructing a synthetic noisy dataset of a monochrome-color binocular camera system in a dark scene;

step S2, constructing a joint denoising and demosaicking model based on the dataset in the step S1, wherein the joint denoising and demosaicking model comprises an aligned guidance image generation module and a guided denoising and demosaicking module;

first, constructing the aligned guidance image generation module, computing, by the aligned guidance image generation module, a feature correlation between the monochrome image and the RAW image in a parallax direction based on a parallax attention mechanism, and constructing an aligned guidance image feature by aggregating a relevant structural feature to obtain an aligned guidance image; and using a clean grayscale image ground truth corresponding to the RAW image as supervision, and training the aligned guidance image generation module until convergence based on a perceptual loss function; and next, constructing the guided denoising and demosaicking module, extracting, by the guided denoising and demosaicking module, a feature of the RAW image and a feature of the aligned guidance image, respectively, performing feature fusion through channel concatenation among a feature dimension, generating a clean RGB image corresponding to the RAW image through a feature decoder, and completing a guided denoising process and a guided demosaicking process simultaneously; and training the guided denoising and demosaicking module until convergence based on a color-structure joint loss function; and step S3, denoising and demosaicking the color RAW image based on the joint denoising and demosaicking model constructed in the step S2.

2. The joint denoising and demosaicking method for the color RAW image guided by the monochrome image according to claim 1, wherein the step S1 further comprises:

sub-step 1.1, dividing each pixel in a normal image captured by a color camera by K in brightness to simulate the dark scene;

sub-step 1.2, sampling, for a left view, a value of a color channel based on a Bayer pattern of RGGB to generate the RAW image; and simulating, for a right view, a complete amount of light entering the monochrome camera by adding values of three color channels to generate the monochrome image; and sub-step 1.3, adding a Poisson-Gaussian noise with same parameters to the monochrome image and the RAW image.

3. The joint denoising and demosaicking method for the color RAW image guided by the monochrome image according to claim 1, wherein said computing, by the aligned guidance image generation module, the feature correlation between the monochrome image and the RAW image in the parallax direction based on the parallax attention mechanism, and constructing the aligned guidance image feature using the relevant structural feature in the step S2 further comprises:

first, demosaicking the RAW image based on a traditional demosaicking algorithm, and transforming the RAW image into a single channel grayscale image by adding the three color channels;

next, extracting a RAW image feature $F_{raw}$ and a monochrome image feature $F_{mono}$ from the left view and the right view through a same feature extractor;

subsequently, computing a correlation weight matrix M in the parallax direction for the RAW image feature $F_{raw}$ and the monochrome image feature $F_{mono}$ based on the parallax attention mechanism, and constructing the aligned guidance image feature: $\hat{F}_{raw}=f(F_{mono})*M$ using a correlation in a row direction, where f represents a convolution operation, and $\hat{F}_{raw}$ represents the aligned guidance image feature; and finally, decoding the aligned guidance image feature $\hat{F}_{raw}$ into the aligned guidance image, which is structural consistent with a target color image by using the feature decoder.

4. The joint denoising and demosaicking method for the color RAW image guided by the monochrome image according to claim 3, wherein the correlation weight matrix M in the step S2 is solved as follows:

tensor dimensions of both the RAW image feature $F_{raw}$ and the monochrome image feature $F_{mono}$ from the left view and the right view are H×W×C, where H, W, and C represent a height, a width, and a number of channels of a feature tensor, respectively; first, passing the RAW image feature $F_{raw}$ from the left view through a convolutional layer of 3×3 to generate a query tensor, passing the monochrome image feature $F_{mono}$ from the right view through two unshared convolutional layers of 3×3, respectively, to generate a key tensor and a value tensor, wherein the query tensor, the key tensor and the value tensor all have a dimension of H×W×C; rearranging and converting a dimension of the key tensor to H×C×W; performing a matrix multiplication on the query tensor and the rearranged key tensor to obtain a correlation calculation result matrix with a dimension of H×W×W, and obtaining the correlation weight matrix M in the row direction by a SoftMax operation.

5. The joint denoising and demosaicking method for the color RAW image guided by the monochrome image according to claim 1, wherein the perceptual loss function in the step S2 is defined as: $L_p=\|F_{VGG}(\hat{G})-F_{VGG}(G)\|_2$, where $L_p$ represents the perceptual loss function; $\hat{G}$ represents an output result of the aligned guidance image generation module; G represents a reference ground truth for supervision, and is set to be a clean grayscale image corresponding to the RAW image; and $F_{VGG}(\cdot)$ represents an image feature extracted by a pre-trained VGG model.

6. The joint denoising and demosaicking method for the color RAW image guided by the monochrome image according to claim 1, wherein the color-structure joint loss function in the step S2 is defined as: $L_{pc}=\|F_{VGG}(\hat{Y})-F_{VGG}(Y)\|_2+\|F_{gaussian}(\hat{Y})-F_{gaussian}(Y)\|_2$, where $L_{pc}$ represents the color-structure joint loss function; $\hat{Y}$ represents a joint denoising and demosaicking result; Y represents a reference ground truth, and is set to be a clean RGB image corresponding to a noisy RAW image; $F_{VGG}(\cdot)$ represents an image feature extracted by a pre-trained VGG model; and $F_{gaussian}(\cdot)$ represents image low-frequency information extracted through Gaussian filtering.

* * * * *